United States Patent Office 3,144,328
Patented Aug. 11, 1964

3,144,328
METHOD OF PRODUCING POROUS SINTERED TANTALUM ANODES
Arnold S. Doty, Indianapolis, Ind., assignor to P. R. Mallory & Co., Inc., Indianapolis, Ind., a corporation of Delaware
No Drawing. Filed May 17, 1960, Ser. No. 29,590
3 Claims. (Cl. 75—200)

This invention relates to tantalum fabrication and more particularly to means and methods of producing porous sintered tantalum anodes.

It is an object of the invention to provide an improved method of producing porous sintered tantalum anodes.

In the production of porous tantalum anodes for tantalum electrolytic capacitors the normal procedure entails the following operations:

(1) Doping tantalum powder with suitable lubricants and/or binders to facilitate pressing and minimize die wear.
(2) Pressing the doped powder into anodes of predetermined size, shape, and weight.
(3) Heat the pressed anodes at low temperature to volatilize the binder or lubricant. This may be accomplished in vacuum or in an inert or reducing atmosphere.
(4) Sintering the anodes at high temperatures (1900 to 2100° C.) in an inert atmosphere or in a vacuum.

The important characteristics of sintered tantalum anodes are:

(1) D.C. leakage
(2) Capacitance
(3) Equivalent Series Resistance

It has been determined that for a given tantalum powder the Equivalent Series Resistance (ESR) of sintered anodes is largely dependent upon the sintered density, the lower the density the lower the ESR. It has also been determined that capacitance/unit weight increases with a decrease in sintered density. It, therefore, follows that high capacitance/unit weight and low ESR can be obtained through a fabricating technique which will result in low sintered density.

With most tantalum powders available presently it is extremely difficult, using the previous fabricating procedures, to obtain anodes having sintered densities less than 8½ gms./cc. which is slightly above 50% of theoretical density. The reasons for this are:

(1) The physical characteristics of the powder do not permit pressing compacts at low density which have sufficient green strength for subsequent handling operations.
(2) High temperature sintering (which is necessary to purify the powder to give low leakage characteristics) results in an appreciable amount of shrinkage which further increases the density.

The present invention relates to a process whereby much lower densities are achieved. The method is as follows: tantalum powder is poured into a suitable cavity in a graphite block. The block is then placed in a vacuum furnace chamber which is evacuated and heated for a suitable time and at a suitable temperature to cause the tantalum powder particles to sinter together into a coherent compact. The temperature should be maintained as low as possible and the time kept at a minimum in order to prevent carburization of the tantalum. Temperatures of 1500 to 1600° C. and times of 30 minutes to 60 minutes have been found to be satisfactory. After this presintering treatment the anode is removed from the cavity in the graphite block, placed in a container of tantalum or other suitable refractory material and sintered at high temperature in a vacuum according to standard practices. Sintered tantalum anodes having densities in the range of 4.5 to 7 gms./cc. have been produced in this manner. Examples obtained by this method are given below:

(1) By this process there have produced sintered anodes for "Micro-Module" capacitors with densities in the range of 5.5 to 6.5 gms./cc. The capacitance of these anodes was around 2260 $\mu$fv./gm. as compared to 1770 $\mu$fv./gm. on anodes having a density of 9.4 gms./cc.
(2) There have also produced some anodes for solid electrolyte capacitors by the same technique as described above for the low density Micro-Module anodes. In this case we used one of our production lots of powder and produced anodes with a sintered density of approximately 6 gms./cc. as compared to a normal density of 9.8 gms./cc. The ESR of these anodes ranged from .77 to .90 ohm as compared to 1.17 ohms on anodes with normal sintered density. The capacitance averaged around 2300 $\mu$fv./gm. as compared to around 2000 $\mu$fv./gm. for anodes at a density of 9.8 gms./cc. In this particular case final sintering time was for one hour instead of the usual ½ hour.
(3) We repeated No. 2 above reducing the sintering time to ½ hour and obtained the following results: Anodes had a sintered density of 4.5 to 5.0 gms./cc. The capacitance averaged around 2500 $\mu$fv./gm. and the ESR averaged around .8 ohm.

It is not intended to limit this invention to the exact procedure described above entailing the use of a graphite mold for presintering. It is understood that the mold cavity could be made from some refractory material which would not react with tantalum at elevated temperature. This would eliminate the necessity of presintering and transferring the anodes to a different container for high temperature sintering. They could be given the high temperature sintering in the original mold and removed only after sintering was complete.

What is claimed is:

1. A method of providing sintered tantalum anodes having a density in the range of from 4.5 to 9.5 gms./cc. comprising the steps of pouring tantalum powder loosely into a suitable cavity in a graphite block, presintering the powder at a temperature of from 1500–1600° C. for a period of 30 to 60 minutes so as to produce a coherent compact, said presintering taking place in an inert atmosphere, cooling the compact to room temperature, transferring the compact to a tantalum container, and sintering the same at a temperature of from 1900–2100° C. in an inert atmosphere so as to obtain an anode having a capacitance of approximately 2260 $\mu$fv./gm. and an equivalent series resistance of from .77 to .90 ohm.

2. A method of producing sintered tantalum anodes having the characteristics of low D.C. leakage, high capacitance per unit weight and low equivalent series resistance comprising the steps of pouring loose tantalum powder into a graphite block, presintering the powder in a vacuum at a temperature of from 1500–1600° C. for a period of from 30–60 minutes to produce a coherent compact, cooling the same to room temperature, and sintering the compact in an inert atmosphere utilizing a tantalum container at a temperature of from 1900–2100° C. to obtain tantalum anodes of a density as low as 4.5 gms./cc.

3. A method of producing sintered tantalum anodes as in claim 2 in which a tantalum wire lead is incorporated therewith by placing a tantalum metal lead therein prior to the presintering and sintering steps.

References Cited in the file of this patent

UNITED STATES PATENTS

| | | |
|---|---|---|
| 2,157,596 | Davis | May 9, 1939 |
| 2,904,430 | Taylor | Sept. 15, 1959 |